UNITED STATES PATENT OFFICE.

JACOB HYDER, OF FORK MOUNTAIN, NORTH CAROLINA.

IMPROVEMENT IN PROCESSES FOR DRYING FRUIT.

Specification forming part of Letters Patent No. 199,910, dated February 5, 1878; application filed November 12, 1877.

*To all whom it may concern:*

Be it known that I, JACOB HYDER, of Fork Mountain, in the county of Mitchell and State of North Carolina, have invented certain new and useful Improvements in Drying Fruits; and I do hereby declare that the following is a full, clear, and exact description thereof, which will enable others skilled in the art to which it appertains to make and use the same.

My invention relates to that class of processes for preserving apples and other fruit in which, prior to drying, the fruit is subjected to a preliminary treatment, whereby it is, when dried, of a bright color and agreeable flavor.

Heretofore a solution of salt in water has been used for the preliminary treatment, and I have myself employed a solution of alum and salt; but the fruit thus prepared, after the drying process is completed, absorbs moisture if exposed to the air, and remains too moist for proper preservation.

By my invention the prepared fruit not only keeps perfectly dry, but is also of a light color and more pleasant to the taste, and of a more natural flavor than that prepared by other processes.

The following description will enable those skilled in the art to which it appertains to make and use my invention.

To a gallon of water add one ounce of sugar, (white sugar is preferred,) one ounce of starch, one ounce of flour, half an ounce of salt, and one gill of milk, preferably sweet milk from which the cream has been removed.

Peel and slice the fruit thin, put the slices into the solution, and let them remain thirty or forty minutes, stirring occasionally; then remove and dry them in the usual way, either near the stove or in the sun, or by means of a fruit-drier, the method of drying not being in itself part of this invention.

In preparing the solution, the starch or the flour may be omitted; but the proportions of the other ingredients should be increased.

The omission of one ingredient would not, perhaps, destroy the value of the solution for treating the fruit prior to drying, and the proportions might also be varied; but the solution as described above I have found to be the best, and that the fruit prepared therewith is very superior.

Having described my invention, what I claim, and desire to secure by Letters Patent, is—

1. The process of treating fruit preparatory to drying, which consists in immersing the same in a solution of water, sugar, starch, or its specified equivalent, salt, and milk, substantially as and for the purpose specified.

2. The hereinbefore-described solution, composed of water, sugar, starch, or its specified equivalent, salt, and milk, substantially as set forth.

In testimony that I claim the foregoing as my own I affix my signature in presence of two witnesses.

JACOB HYDER.

Witnesses:
ALFRED WILLCOX,
GLEN FRANCES.